Nov. 9, 1965   G. H. HURST, JR., ETAL   3,216,274
GEAR SHIFT
Filed May 4, 1964   2 Sheets-Sheet 1

INVENTORS.
GEORGE H. HURST, JR.
WILLIAM G. CAMPBELL
BY
ATTORNEY.

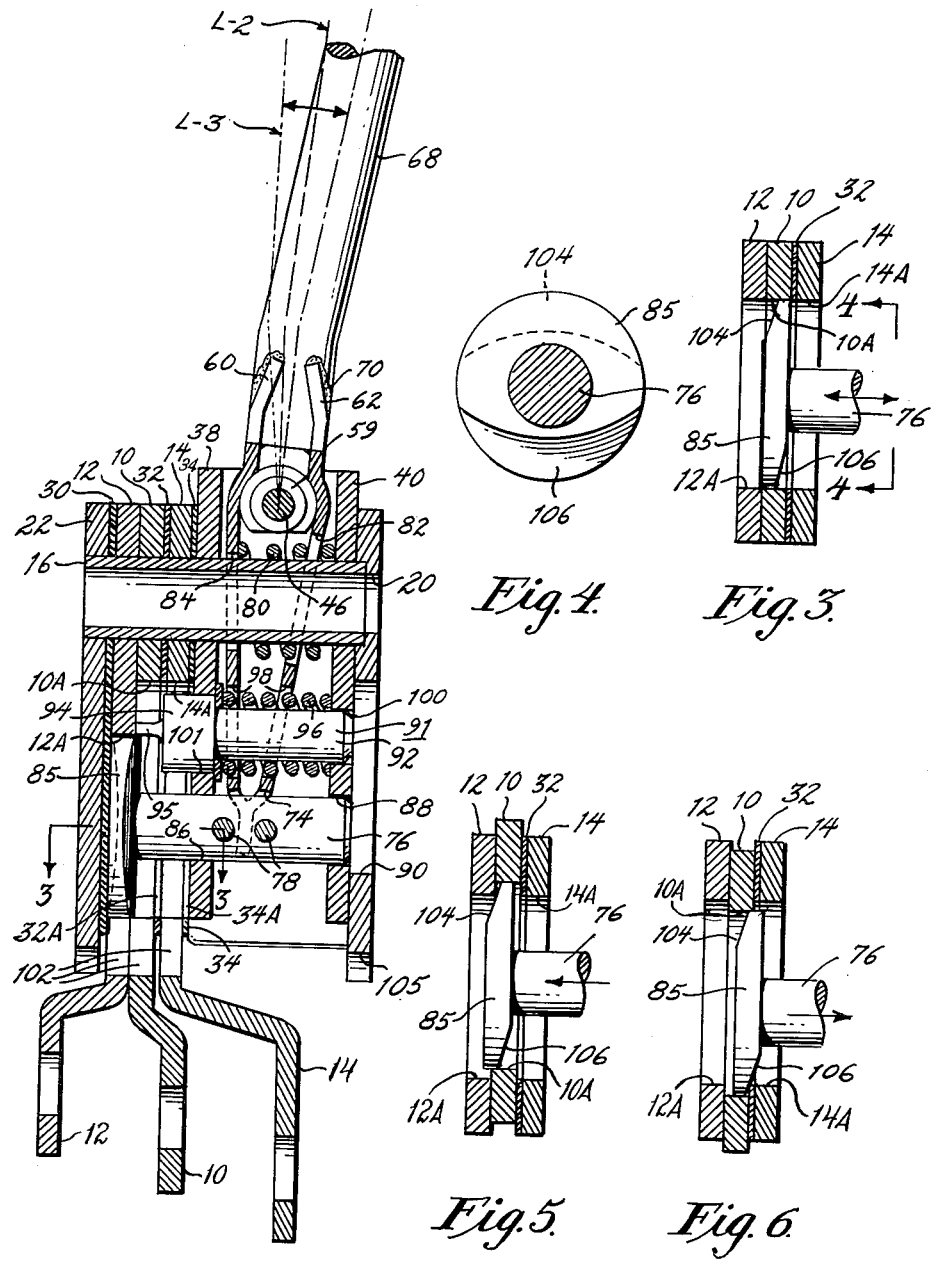

United States Patent Office 3,216,274
Patented Nov. 9, 1965

3,216,274
GEAR SHIFT
George H. Hurst, Jr., Abington, and William G. Campbell, Chalfont, Pa. (both of 341 W. Glenside Ave., Glenside, Pa.)
Filed May 4, 1964, Ser. No. 364,636
14 Claims. (Cl. 74—476)

In general, this invention relates to a new and improved gear shifting mechanism. More particularly, it relates to a four forward speed gear shifting mechanism which is compact, easy to operate, and most nearly resembles an in line gear shifting mechanism in operation.

One object of this invention is the provision of an improved four forward speed gear shifting mechanism in which one may shift simply and easily from and to, various forward gear positions in a manner similar to the operation of an in line gear shifting mechanism.

Another object of this invention is the provision of an improved gear shifting mechanism in which the forward speed gear actuating levers and reverse gear actuating lever substantially abut one another so as to minimize the length of the neutral gate and to shorten the movement of the handle which is necessary to shift from one gear position to another.

A still further object of this invention is the provision of an improved gear shifting mechanism which prevents shifting into reverse gear position, until the forward speed gear actuating levers have been returned to full neutral position.

Still another object of this invention is to provide a gear shifting mechanism which is easy to align during assembly, and the alignment of which can be checked with little or no difficulty.

In the accompanying drawings in which:

FIG. 2 is a cross-sectional view of the assembled gear shifting mechanism of the present invention with the operating handle and the transmission in the neutral position.

FIG. 3 is a partial cross-sectional view taken along lines 3—3 of FIG. 2.

FIG. 4 is an end view of the gear selector lever engaging head taken along lines 4—4 of FIG. 3.

FIG. 5 is similar to FIG. 3 but showing gear shifting mechanism in the process of shifting from second to third forward gear.

FIG. 6 is similar to FIGS. 3 and 5 but showing what happens if an attempt is made to shift into reverse gear without having first brought gear selector levers to neutral position.

Figures 1, 7:
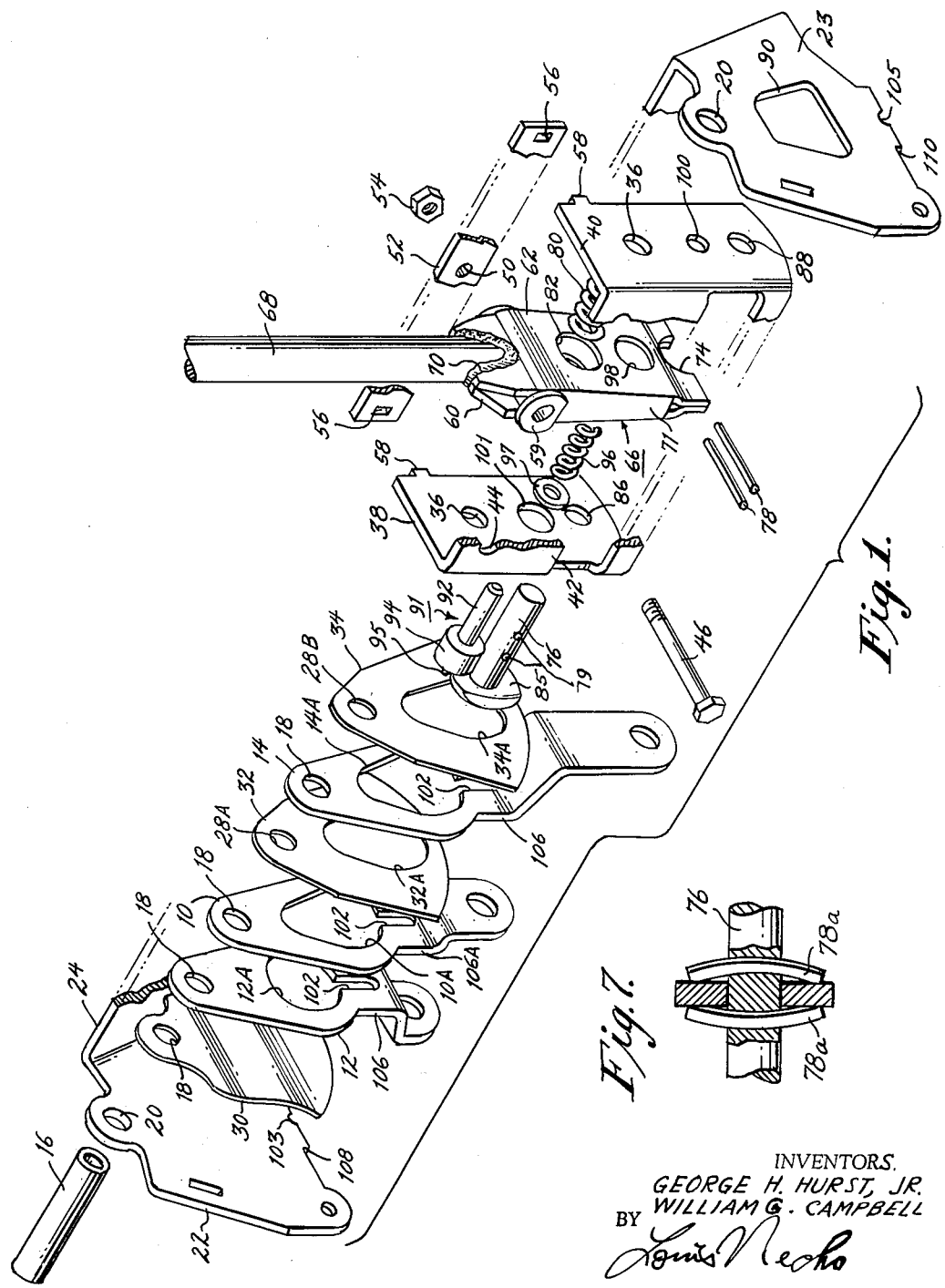
FIG. 1 is an exploded view of the gear shifting mechanism of the present invention.
FIG. 7 is a fragmentary view, partly in top plan and partly in section showing a slightly modified construction.

The gear shift mechanism shown in FIGS. 1 and 2 includes a gear selector lever 10 for shifting to first and second forward speed position; a second gear selector lever 12 for shifting to third and fourth speed position and a third gear selector lever 14 for shifting to reverse gear position. The manner in which selector levers of this type operate is shown in Patent 3,052,135 and is therefore not shown nor described in further detail. It is enough to say that these levers are mounted for rotation about the axis of an assembly sleeve, or bolt 16, which passes through aligning openings 18, in said levers, and that, when lever 10 is moved, to and fro transversely of the axis of sleeve 16, it will shift the transmission to first, or to second, forward speed gear position; that when lever 12 is moved, it shifts the transmission to third, or to fourth, forward speed gear position, and that, when lever 14 is moved, from its neutral to its gear selecting position, it shifts the transmission into reverse gear position.

As best shown in FIGURE 1, mounting sleeve 16 also passes through aligning openings 20 in side walls 22 and 23 of an outer U-shaped mounting bracket which includes bight portion 24, and which is suitably secured to the transmission housing in the manner shown in the present aforesaid or in any other suitable manner, not shown. Mounting sleeve 16 also passes through opening 18 in wave plate 30 which acts as a spring to prevent or minimize rattling, through opening 28A in spacer plate 32 which separates reverse lever 14 from first and second lever 10 for a purpose hereinafter set forth, and through opening 28B in plate 34 which serves to protect reverse lever 14 from contact with the adjacent, movable parts hereinafter described to prevent unintended movement of the reverse lever. Mounting sleeve 16 also passes through aligning openings 36 in the side walls 38 and 40 of an inner U-shaped assembly bracket the bight portion 42 of which is provided with a hole 44 for receiving bolt 46 which also passes through a registering hole 50 in cover plate 52 and is engaged by nut 54. Cover plate 52 is provided with openings 56 which are adapted to receive tabs 58 on the edges of walls 38 and 40 of the assembly bracket. Bolt 46 perferably passes through nylon, or other, bearings 59 which are seated between the upper portions of pendent arms 60 and 62 which, in effect, form an extension 66 of operation handle or stick 68. The upper ends of arms 60 and 62 are welded to the handle, as at 70, and are interconnected by end plates 71 to produce a sufficiently rigid assembly without the use of heavy castings or forgings and the added cost of machining. The lower edge of handle extension 66 is recessed as at 74 to receive pin 76 to which it is operatively coupled by means of transverse pins 78 which pass through opening 79 in pin 76 whereby rocking of handle 68 in the direction of the axis of mounting sleeve 16 will reciprocate pin 76 in the direction of its axis.

Handle 68 is normally biased to the position shown in FIG. 2 by a spring 80 which is carried by sleeve 16 and one end of which passes through large opening 82 in arm 62 and abuts side wall 40 of the inner assembly bracket and the other end of which abuts wall 60 of the handle extension. Arm 60 of the handle extension is provided with an opening 84 which is too small to permit spring 80 to pass therethrough but which is large enough to permit handle 68 to be rocked in the direction of the double-headed arrow in FIG. 2. By this arrangement, the operating handle, unless restrained, will assume the position of FIG. 2. Pin 76 is provided with a lever engaging head 85 which is hereinafter referred to. From FIGS. 1 and 2 it will be seen that pin 76 is slidable in guide openings 86 and 88 in the walls 38 and 40 of the assembly U-shaped bracket and that wall 23 of the outer mounting bracket is provided with an opening 90 through which the adjacent end of pin 76 may pass when the pin is moved to its extreme right hand position as viewed in FIGURE 2.

Associated with pin 76 is a plunger 91 which includes a stem 92 and a hub 94 and is always biased to the left, as viewed in FIGURE 2, by a spring 96 which is confined between wall 40 of the assembly bracket and a washer 97 abutting hub 94. It will be noted that stem 92 of the plunger and spring 97 pass freely through registering openings 98 in arms 60 and 62 of handle extension 66; that the stem 92 of the plunger passes freely through an opening 100 in side wall 40 of the assembly bracket and that the hub 94 of the plunger passes freely through an opening 101 in side wall 38 of the assembly bracket. When plunger 91 is moved to the right, as viewed in FIG- URE 2, its stem 92 projects into opening 90 in wall 23 of the outer mounting bracket. Plates 10, 14, 32 and 34 are provided with openings 10A, 14A, 32A and 34A, respectively, said openings being large enough to receive the head 85 of pin 76 and the hub 94 of plunger 91. Plate 12 is provided with an opening 12A which is only big enough to receive head 85 of pin 76.

With the parts assembled as shown in FIG. 1 and with levers 10, 12 and 14 connected to the respective gear trains as shown in the patent aforesaid, and with the transmission in neutral position, operating handle 68 will be biased, by spring 80, to the position shown in FIG. 2 in which the head 85 of pin 76 enters opening 12A in third and fourth speed lever 12. If handle 68 is now moved transversely of the axis of sleeve 16, it will move lever 12 to shift the transmission to third, or to fourth forward speed gear position depending on the direction of movement of the handle. It will be noted that the head 94 of plunger 91 is provided with the projection 95 which abuts lever 12 and limits movement of plunger 91 in response to the force of spring 96 and that the hub 94 of the plunger is out of opening 10A in lever 10. To shift to first, or to second gear position, operating handle 68 is moved to the position of broken line L2 to withdraw engaging head 85 from opening 12A into opening 10A in lever 10 whereby movement of the handle transversely of the axis of sleeve 16 will shift the transmission accordingly. It will be noted that the left face of plunger head 94 registers with the plate 32 which serves as an interlock in that engaging head 85 must fully clear the right hand face of this fixed interlock before the engaging head can begin to move reverse gear lever 14. In other words, the necessity to clear fixed plate 32 makes it impossible to engage and move reverse gear lever 14 unless the engaging head 85 has been fully disengaged from first and second gear lever 10. As operating handle 68 is moved toward broken line position L3, engaging head 85 will come into contact with hub 94 of plunger 90 and must move the plunger to the right against the force of spring 96. In fact, by the time plunger head 94 is moved out of opening 14A, spring 96 will have been considerably, if not fully compressed. The resistance of the spring puts the operator on notice that the transmission is being shifted into reverse and thus prevents inadvertent shifting into reverse.

Levers 10, 12 and 14 are provided with slots 102 for receiving a key not shown, which when inserted through slots 102 and through notches 103 and 105 in side walls 22 and 23 insures that the levers are properly aligned before completing the assembly. In order to approach in-line-shifting, the diagonally opposed portions 104 and 106 of head 85 are bevelled as shown in FIGS. 3 to 6 so that, in moving into opening 10A for shifting into first or second gear, bevelled portion 104 will permit the left hand portion of the engaging head to enter opening 10A before the engaging head has wholly cleared reverse opening 14A, and so that, in moving into opening 12A for shifting into third and fourth gear position; the bevelled portion 106 of the engaging head 85 begins to enter opening 12A before the engaging head has fully cleared opening 10A. Likewise, when moving into opening 14A for shifting into reverse gear the bevelled right hand portion 106 of the engaging head will begin to enter opening 14A in reverse actuating lever 14 before the engaging head has fully cleared opening 10A.

In FIG. 3 levers 10, 12 and 14 are shown in the neutral position in which openings 10A, 12A and 14A are in alignment with each other, and in the assembly of FIG. 2 they will be in alignment with opening 32A in plate 32 and with opening 34A in plate 34. See FIGS. 3 to 6. From the position of FIG. 3 engaging head 85 can be moved into opening 12A to shift to third or fourth forward speed or it can be moved into opening 14A to shift into reverse gear. Also, in the position of FIG. 3, with engaging head 85 in opening 10A, moving handle 68 transversely of sleeve 16, shifts the transmission into first forward speed gear position or to second forward gear speed position, depending on the direction of the movement of the handle. It will be noted that, having shifted to first or to second gear, handle 68 and gear actuating lever 10 must be returned to the neutral gate, or position, before moving engaging head 85 into opening 12A preparatory to shifting to third or fourth forward speed gear position. In FIG. 5, the engaging head 85 is shown leaving opening 10A and entering opening 12A preparatory to shifting into the third or fourth gear position, or to the position of broken line L2. It will be seen from this figure that bevelled portion 104, bearing against the edge of opening 12A in lever 12 allows the engaging head 85 to begin entering opening 12A, before the engaging head has fully cleared opening 10A. From FIG. 6 which shows the position of the engaging head while shifting from first forward speed gear position to reverse gear, it will be seen that bevelled portion 106 permits the right hand portion of engaging head 85 to begin entering opening 14A before the engaging head has fully cleared opening 10A. This function is most easily perceived if, in looking at FIGS. 5 and 6, engaging head 85 is visualized as having a square periphery. With a square periphery, engaging head 85 cannot begin to move from one opening into another unless the openings concerned are in complete alignment with each other which means that the handle 68 must first be brought to full neutral position.

According to this invention, bevelled portions 104 and 106 can be omitted for conventional H-pattern shifting or they can be used to expedite shifting.

Gear actuating levers 10, 12, and 14 are provided with indexing edges 106A which, when in alignment with flat indexing edges 108 and 110 on side walls 22 and 23, would indicate that all of the gear actuating levers are in correct alignment. This facilitates the assembly of the gear shift mechanism because the operator can feel the indexing edges referred to and is able to make sure that the parts are in alignment without having to see them. Besides, palpation is a more sensitive gauge than vision.

Instead of straight pins 78 of FIG. 1 we may use pins 78a the ends of which are bent as shown in FIG. 7 to clamp the lower ends of arms 60 and 62 therebetween and prevent, or minimize rattling originating in these parts.

It will be seen from the foregoing that the gear shift mechanism of our invention is made up of parts most of which are simple stampings; that the operation is rapid and smooth, that unintended shifting to reverse gear is rendered impossible and that wave plate 30, spring 96, spring 80 and best pins 78a cooperate to reduce rattling.

Engaging head 85 is perferably thicker than gear selector lever 12 whereby as the engaging head is moved into opening 12A in third and fourth speed selector lever 12, and when selector lever 12 is moved fore or aft to place this transmission in third and fourth speed position, the right face of the engaging head will slide against the left side of first and second speed gear selector lever 10 and against wave plate 30. By this arrangement the engaging head will be "wedged" between lever 10 and wave plate 30 as long as the car is moving in third or fourth speed, and being so wedged, it cannot rattle.

What we claim is:

1. A gear shift mechanism for a transmission having four forward speed gear positions and a reverse gear position, said mechanism including a first lever connectable to said transmission for shifting to first, or to second, gear position, a second lever disposed to one side of said first lever and connectable to said transmission for shifting to third, or to fourth, gear position, a third lever disposed to the other side of said first lever and connectable to said transmission for shifting to reverse gear position, means mounting said levers for individual rotation transversely of a common axis, there being registering openings in said levers which, when said levers are in neutral position, form a continuous passage, an engaging head, an operating handle, means pivotally mounting said handle for rotation transversely of said common axis and for rocking movement in the direction of said axis, means connecting said handle to said head whereby, rocking said handle longitudinally of said axis moves said head into engagement with an opening in one of said levers and whereby, movement of said handle transversely of said axis rotates said one lever, to shift the transmission to a selected gear position, a plunger movable into and out of the opening in said third lever, at least a portion of said plunger being in the path of movement of said engaging head towards the opening in said third lever, and means normally biasing said plunger toward said opening.

2. The structure recited in claim 1 and plates fixed on said axis and disposed on opposite sides of said third lever said plates having openings therein registering with the openings in said levers.

3. The structure defined in claim 1 in which the diagonally opposed peripheral portions of said engaging head are bevelled.

4. A gear shift mechanism for a transmission having four forward speed positions and a reverse gear position, said mechanism including, an elongated mounting member, a first actuating lever mounted for rotation transversely of said mounting member, to a neutral position, to a first gear position, and to a second gear position, said first lever having a first opening therein, a second actuating lever mounted for rotation transversely of said mounting member, to a neutral position, to a third gear position and to a fourth gear position, said second lever having a second opening therein, a third actuating lever mounted for rotation transversely of said mounting member to a neutral position or to reverse gear position, said third lever having a third opening therein, a first fixed plate between said first and third levers, said first fixed plate having a fourth opening therein which in the neutral positions of said levers, registers with the openings in said levers, an assembly bracket disposed adjacent said third lever and mounted for rotation about said mounting member, a second fixed plate between said third lever and said assembly bracket, said second plate having a fifth opening therein which, in the neutral position of said levers register with the openings in said levers, a mounting bracket carrying said mounting member and attachable to the housing of a transmission to be shifted by said mechanism, an operating handle mounted for rotary movement transversely of said mounting member and for rocking movement in the direction of the axis of said mounting member, said first, second and third openings being in alignment when said levers are in their neutral positions, a lever engaging head operatively connected to said handle and movable, by the rocking of said handle into any one of said openings, means normally biasing said handle to move said pin toward said second opening to couple said second lever to said handle, a plunger, and means biasing said plunger into said third opening, said plunger being in the path of movement, and yieldably resisting the entry of, said head into said third opening.

5. A gear shift mechanism for a transmission having four forward-speed gear positions and a reverse gear position, said mechanism including:

a first lever connectable to said transmission for shifting to neutral and to a selected forward speed gear position, a second lever disposed to one side of said first lever and connectable to said transmission for shifting to neutral and to a selected forward speed gear position, a third lever disposed to the other side of said first lever and connectable to said transmission for shifting to neutral and to reverse gear position, means mounting said levers for individual rotation transversely of a common axis, there being registering openings in said levers which, when all of said levers are in neutral position, form a continuous passage, an engaging pin, an operating handle, means pivotally mounting said handle for rotation transversely of said common axis and for rocking movement in the direction of said axis, connecting means for coupling said pin to said handle whereby rocking said handle moves said pin into engagement with an opening in one of said levers and whereby movement of said handle transversely of said axis rotates said one lever to shift said transmission to a selected gear position, and, said connecting means including a yoke like member straddling said pin transversely of the longitudinal axis thereof, and means protruding from said pin and disposed on both sides of said member for detachably coupling said pin to said handle.

6. A gear shift mechanism for a transmission having four forward-speed gear positions and a reverse gear position, said mechanism including an elongated mounting member, a first lever connectable to said transmission for shifting to first, or to second, gear position, a second lever disposed to one side of said first lever and connectable to said transmission for shifting to third, or to fourth, gear position, a third lever disposed to the other side of said first lever and connectable to said transmission for shifting to reverse gear position, means mounting said levers for individual rotation, transversely of said mounting member, to a neutral position or a gear selecting position, a fixed plate between said first and third levers, there being registering openings in said levers and in said plate which, when said levers are in neutral position, form a continuous passage, an engaging head, an operating handle, means pivotally mounting said handle for rotation transversely of said mounting member and for rocking movement in the direction of the axis thereof, means connecting said handle to said head whereby, rocking said handle moves said engaging head into engagement with one of said levers, and whereby rotation of said handle moves the lever engaged by said engaging head to neutral or to a selected gear position, diagonally opposed marginal portions of said head being bevelled to permit the central unbevelled portion on one side of said engaging head to enter an opening in one adjacent lever before the opposite central, unbevelled portion of said engaging head is fully withdrawn from the opening in the other adjacent lever.

7. The structure defined in claim 6 and a plunger including a stem and a hub, means normally biasing said plunger toward said levers, and means limiting the movement of said plunger to position said hub within said third opening yieldably to obstruct the movement of said engaging head into the opening in said third lever.

8. The structure recited in claim 7 and an assembly bracket including two spaced walls, there being a first pair of registering openings in said walls for receiving the stem of said plunger and a second pair of registering openings in said walls for receiving the stem of said head in parallelism with the stem of said plunger.

9. A gear shifting mechanism comprising an operating handle, mounting means mounting said handle for rotation about first and second axes disposed transversely of one another, biasing means biasing said handle about first axis in a first direction, an engaging head coupled to said handle for movement therewith, a reverse gear lever, a first and second forward gear lever, a third and fourth forward gear lever, each having an engaging head receiving opening therein and each mounted for pivotal movement about said second axis, said engaging head having a thickness not less than the thickness of any one of said levers, each of said levers being substantially equal in thickness, a movable plunger, said movable plunger being mounted for movement in the opening in said reverse gear lever, and means normally biasing said plunger into said opening whereby said plunger yieldably resists movement of said engaging head into the opening in said reverse gear lever.

10. The gear shifting mechanism of claim 9 in which said levers are arranged in the order named with the reverse gear lever nearest said handle, and means for preventing movement of said plunger beyond the opening in said reverse gear lever.

11. The gear shifting mechanism of claim 9 and yielding means pressing against said levers to discourage rattling while permitting free movement of said levers.

12. A gear shifting mechanism comprising an operating handle, mounting means mounting said handle for rotation about first and second axes disposed transversely of one another, first biasing means biasing said handle about said first axis in a first direction, said mounting means limiting rotation of said handle in said first direction, an engaging head coupled to said handle for movement therewith, a reverse gear lever, a first and second forward gear lever, and a third and fourth forward gear lever each having an engaging head receiving opening therein and each mounted for pivotal movement about said second axis, said engaging head having diametrically opposed, oppositely bevelled peripheral portions to facilitate entry of said engaging head into the openings in said levers regardless of the direction of movement of said engaging head relative to said levers.

13. The gear shifting mechanism of claim 9 and means to facilitate accurate adjustment and assembly of said gear shifting mechanism, said means comprising auxiliary openings therein adapted to receive a common aligning key to insure proper alignment of said levers when in neutral position.

14. The gear shifting mechanism of claim 9 and means to facilitate accurate adjustment and assembly of said gear shifting mechanism, said means comprising flat edge portions which are provided on corresponding portions of said levers and which align when said levers are in their neutral position.

References Cited by the Examiner
UNITED STATES PATENTS

| | | | |
|---|---|---|---|
| 3,052,135 | 9/62 | Hurst et al. | 74—477 X |
| 3,082,638 | 3/63 | Nilson | 74—476 X |

MILTON KAUFMAN, *Primary Examiner.*